May 31, 1932.  F. ST. GEORGE ET AL  1,861,101
AUTOMOBILE THEFT PREVENTIVE SIGNAL
Filed July 22, 1929  2 Sheets-Sheet 1
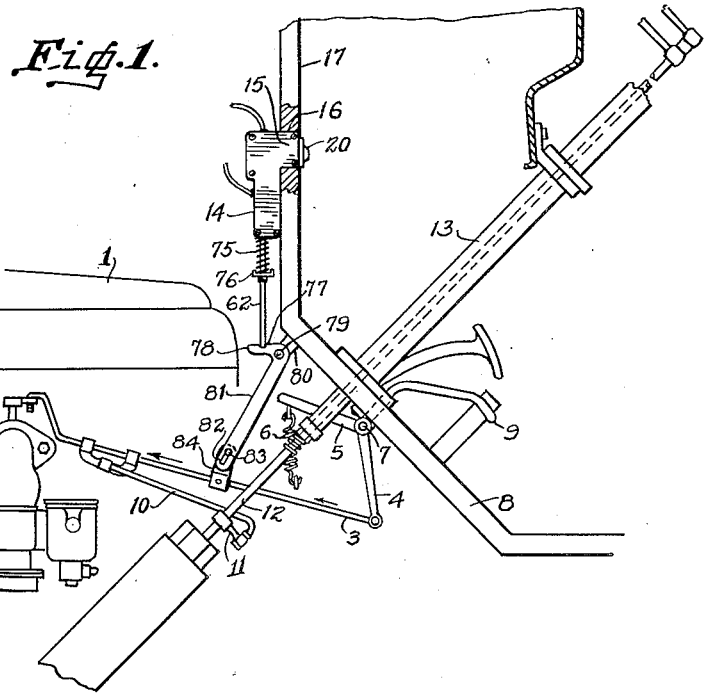
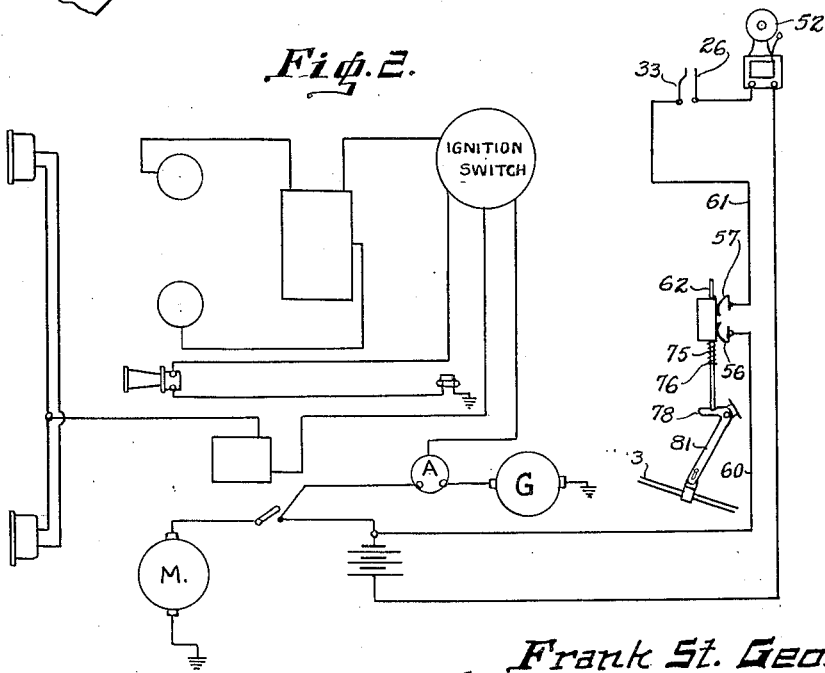
Inventors
Frank St. George
and Frank W. Cross
By Mason Fenwick & Lawrence
Attorneys

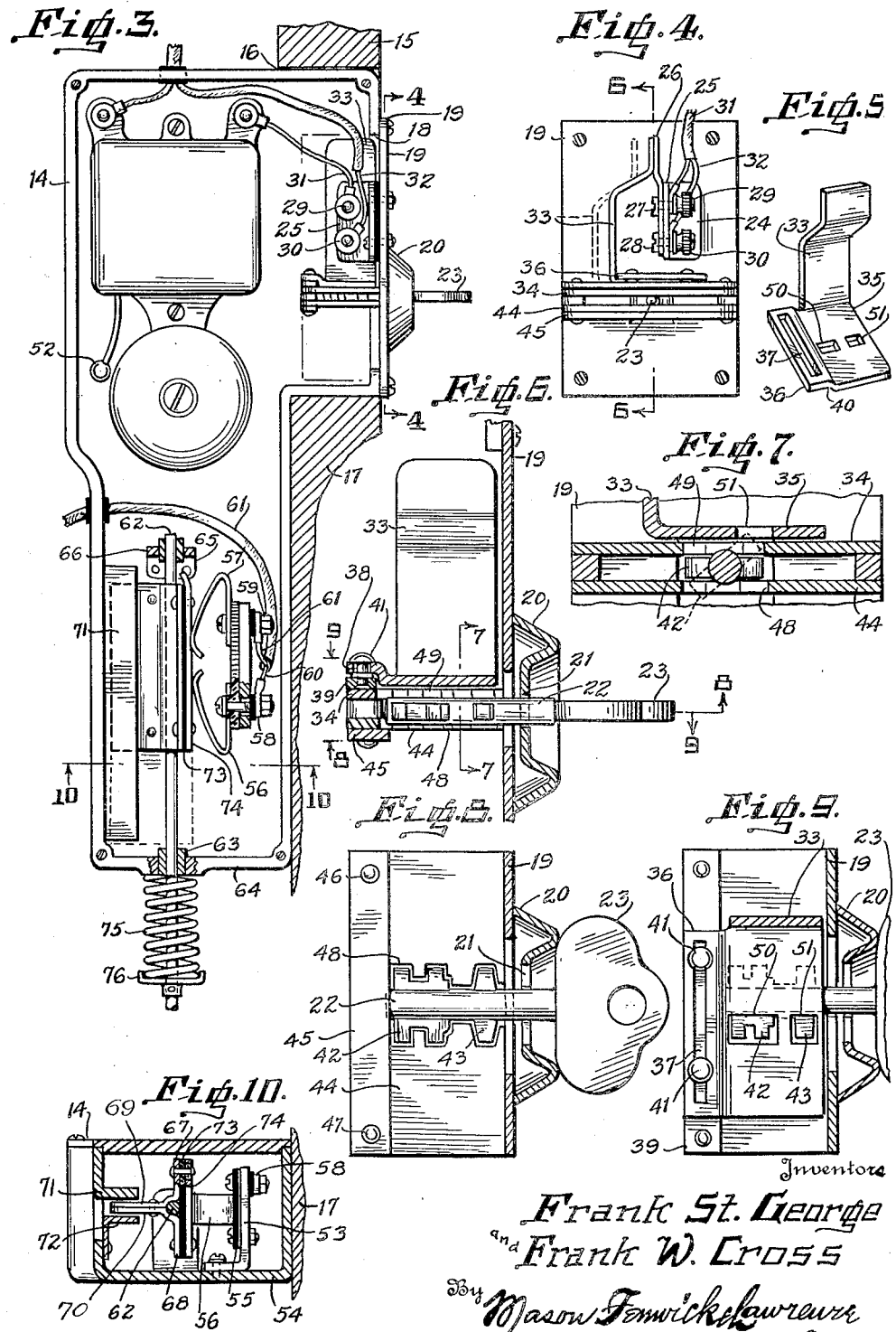

Patented May 31, 1932

1,861,101

UNITED STATES PATENT OFFICE

FRANK ST. GEORGE AND FRANK W. CROSS, OF BOSTON, MASSACHUSETTS

AUTOMOBILE THEFT PREVENTIVE SIGNAL

Application filed July 22, 1929. Serial No. 380,145.

This invention relates to signalling devices and more particularly to those operated to indicate when an automobile is being operated by an unauthorized person, and thereby to prevent the theft of automobiles and similar vehicles by giving an audible or visual signal distinct from and independently operable from the usual warning signal with which motor vehicles are commonly equipped.

The main object of the invention is to provide a simple compact signal which can be applied to the operative mechanism of the present day automobile without necessitating any great amount of labor in applying the signal or altering in any way the parts of the motor mechanism already installed.

Other objects of the invention will become apparent as the detailed description thereof proceeds.

In the drawings:

Fig. 1 is a fragmentary side elevation of the steering mechanism of an automobile, and of the linkage commonly employed in automobiles to operate the accelerator rod connected to the throttle of the engine carburetor;

Fig. 2 is a wiring diagram of an automobile in common use and showing, in addition to the common wiring, the wiring connections necessary to control the operation of this theft preventive signal;

Fig. 3 is a fragmentary side elevation to an enlarged scale of the signal mechanism enclosed in a casing ready to be attached to the ignition and fuel controlled systems of an automobile;

Fig. 4 is a section taken on the line 4—4 of Fig. 3;

Fig. 5 is a perspective view of one of the contact elements of the signal systems;

Fig. 6 is a vertical section taken on the line 6—6 of Fig. 4;

Fig. 7 is a vertical section taken on the line 7—7 of Fig. 6;

Fig. 8 is a horizontal section taken on the line 8—8 of Fig. 6;

Fig. 9 is a horizontal section taken on the line 9—9 of Fig. 6; and

Fig. 10 is a horizontal section taken on the line 10—10 of Fig. 3.

As shown in the drawings, the invention itself is adapted to be applied to an automobile provided with an internal combustion engine 1, provided with a carburetor 2, which is controlled in operation by an accelerator rod 3. One end of the rod 3 is pivotally connected to one arm 4 of a bell crank lever, the other arm 5 of which has its free end connected to a tension spring 6, which in turn, has its other end connected to a fixed part of the chassis of the automobile. The bell crank 4—5 is rotated about the pivot 7, suitably connected to the foot board 8 of the driver's compartment, by means of the foot pedal 9 which is rigidly connected to the arms 4 and 5 of the said bell crank.

The accelerator rod 3 may be operated alternatively by the link 10 pivotally connected at one end to the rod 3 and pivotally connected at its other end to an arm 11 fixed to a rod 12 extending through the steering column 13 of the automobile into the driver's compartment.

The mechanism so far described is standard equipment on practically all automobiles of the present day. The mechanism comprising the present invention is adapted to be connected with very little trouble to this standard equipment, and with no change whatever in such equipment, nor in the ignition system, which, also, comprises part of the control means for the internal combustion engine. The ignition system is shown diagrammatically in Fig. 2; and, as it is well known, will not be specifically described herein except in connection with such details as are necessary to show the connection of the present invention therewith.

The present invention preferably comprises three essential parts; namely, a signal, a key controlled switch connected to said signal, and a sliding switch operably connected to the accelerator rod 3. As shown in the drawings, these three parts are mounted in a casing 14 having a part projecting therefrom and adapted to be seated in an aperture 16 cut through the dash board 17 of the motor vehicle. The front face is provided with an aperture closed by a plate 19.

The plate 19 is provided with a conical pilot plate 20 having a slot 21 therein for guiding the shank 22 of a key 23 into operative position relative to switch mechanism mounted on the back of the face plate 19. This switch mechanism includes a bracket 24 secured to the back of plate 19, on which is suitably mounted a plate 26, for making contact between the terminals 29 and 30, when the closing plate 33 is in the position shown by solid lines in Figure 4. Wires in the sheath 31 connect terminals 29 and 30 in series with the signal circuit, to be described.

The locking switch, just described, includes a circuit closing plate 33, slidably mounted on a plate 34 fixed perpendicularly to the back of the plate 19. The circuit closing plate 33 is provided, at its lower end, with a flange 35, having a lateral extension 36, provided with a long slot 37, which is adapted to receive slidably the guide pin 38 fixed to a strip 39 which is secured to the outer end of the plate 34. The plate 39 forms the guide strip cooperating with the edge 40 of the flange 35 to hold the said flange 35 in slidable straight line movement along the back of the face plate 19; and the pin 38 is provided with a head 41 for slidably securing the flange plate 35 to the fixed plate 34.

The key 23 has a series of wards 42 and 43 projecting from opposite sides thereof; and the shank 22 of this key is rotatable between the bottom of plate 34 and the top face of a plate 44, which is secured at its front edge to the back of the plate 19, and is provided, at its rear edge, with a bracing plate 45, adapted to be suitably secured by screws or rivets 46 and 47 to the plate 34 and the strip 39.

The opposed faces of the plates 34 and 44 are provided with slight cylindrical recesses to receive the circular part of the shank 22 of the key 23. The bottom plate 44 is provided with an aperture 48 shaped to the outline of the wards 42 and 43 in order to permit the key to turn when it is properly inserted between the plates 34 and 44. The upper plate 34 is provided with an aperture 49 similar to the aperture 48 in the lower plate; and, the flange 35 is provided with apertures 50 and 51, adapted to receive the wards 42 and 43, respectively, when the key is properly inserted and turned in a direction to separate the contact plate 33 from the contact plate 26. The flange 35 is held frictionally in whatever position it may be adjusted to by the key 23, although it might be biased to close the contact plates 33 and 26 by means of a spring suitably applied to the plate 33.

The signal part of the invention as shown in this case comprises a bell 52 of any well known construction. While this bell may be mounted in any suitable position anywhere in the automobile, it is shown for convenience as mounted in the casing 14 which contains the switches controlling the operation thereof.

The signal need not be a bell; it may be a whistle or any kind of visual signal capable of being controlled electrically; or it may be omitted altogether and the signal horn, with which automobiles are usually provided may be substituted therefor by suitably connecting the wires of the two switches to the wiring of the horn.

In order to control the operation of the signal by a moving part necessary for operation of the engine, there is provided a sliding switch operable only when the accelerator pedal 3 is moved to supply fuel to the engine. The details of this last named switch are shown in Figs. 3 and 10. This sliding switch comprises a plate 53 suitably insulated from and secured to the side 54 of the casing 14. A strip of insulation 55 is secured to the plate 53 and upon this strip of insulation there are suitably secured two contact plates 56 and 57 suitably insulated from each other and connected by clamping screws 58 and 59, respectively, to the wires 60 and 61, which are adapted to be connected in series with the alarm and the key controlled switch of the system.

In order to close the circuit between the spring contact plates 56 and 57, there is mounted in the casing 14 a rod 62, slidable through an aperture 63 in the end wall 64 of the casing 14, and through a bearing 65 formed in a supporting bracket 66 secured to the wall 54 of the casing 14. The rod 62 has clamped thereto a pair of rectangular plates 67 and 68 having the horizontal flanges 69 and 70 riveted or otherwise secured to each other, and extending as guide elements between flanges 71 and 72 of channel members, suitably secured to the back wall of the casing 14 and spaced apart just enough to allow the flange members 69 and 70 to slide freely therebetween.

The plates 67 and 68 have a strip of insulation 73 fixed thereto, and a strip of conducting material 74 is secured to the face of this strip 73, in order to form a circuit closing conducting strip between the contact plates 56 and 57 when the rod 62 slides the strip 74 from the position shown by dotted lines in Fig. 3 into the position shown in full lines in the same figure.

The dotted line position shown in Fig. 3 is the normal position of the contact closing plate 74, and the plate 74 is held in this dotted line position by means of a compression spring 75, which surrounds the rod 62 where it projects from the end wall 64. One end of the spring 75 abuts the end wall 64 and the other end seats in a cup-like member 76 pinned in suitable condition to the rod 62 in order to ensure that the rod 62 and the contact closure plate 74 shall be normally positioned out of closing contact with the plates 56 and 57.

In order to operate the rod 62, the end thereof outside the casing 14 is seated in a small recess 77 formed in the arm 78 of a bell crank lever which is pivoted to swing about a pin 79 extending from a bracket 80 fixed to the foot board 8 of the automobile. The other arm 81 of the bell crank has the end thereof provided with a slot 82 which receives a pin 83 projecting laterally from a plate 84 suitably clamped to the accelerator rod 3 (see Fig. 1). It will be obvious from inspection of Fig. 1 that when the accelerator pedal 9 is depressed, it will move the bell crank 4—5 against the tension of the spring 6 to push the lever 3 forwardly toward the carburetor to operate the throttle thereof. This forward movement of the accelerator rod 3 will cause the pin 83 to slide in this slot 82 of the bell crank arm 81, and thereby move the bell crank arm 78 upwardly to force the rod 62 against the pressure of spring 75 to cause the plate 74 to contact with both the contact plates 56 and 57 and thereby close the circuit to ring the bell 52, providing, of course, that the closing plate 33 is against plate 26, as described with reference to Figure 4.

The operation of the invention will also be apparent from the wiring diagram shown in Fig. 2, in which the elements of the invention are designated by the same reference numerals as in the other figures of the drawings, but are only shown diagrammatically. The elements of the ignition system, not forming part of this invention, have suitable legends applied thereto to indicate their function in the ignition system and their location relative to the parts of this invention.

What we claim is:

1. As an article of manufacture, a casing having a key-operated switch mounted on the wall of said casing, a key-hole in the said wall leading to the switch, a second switch and an audible alarm in the casing, means operable by an engine control member extending through the casing for opreating the second switch, and outlets in the walls of the casing for said switch operating means, whereby tampering with the parts within the casing is prevented, and a circuit including said switches and alarm which cannot be closed without sounding the alarm when the key-operated switch is closed.

2. As an article of manufacture, an elongated casing having a lateral enlargement at one end forming a recess communicating with the interior of the body of the casing, a key-operated switch mounted on the end wall of said enlargement within the recess, a key-hole in the said end wall leading to the switch, a second switch and an audible alarm in the respective ends of the casing body, means operable by an engine control member extending through the casing for operating the second switch, and outlets in the walls of the casing for said switch operating member, whereby tampering with the parts within the casing is prevented, and a circuit including said switches and alarm which cannot be closed without sounding the alarm when the key-operated switch is closed.

In testimony whereof we affix our signatures.

FRANK ST. GEORGE.
FRANK W. CROSS.